United States Patent
Van Druff et al.

(10) Patent No.: US 7,413,247 B2
(45) Date of Patent: Aug. 19, 2008

(54) OCCUPANT RETRACTION SYSTEM

(75) Inventors: Charles E. Van Druff, Laguna Hills, CA (US); Christopher C. Culbertson, Irvine, CA (US); Mark W. Emory, Anaheim, CA (US); Mark A. Forster, Diamond Bar, CA (US)

(73) Assignee: H. Koch & Sons Co., Inc., St. Petersburg, FL (US)

( * ) Notice: Subject to any disclaimer, the term of this patent is extended or adjusted under 35 U.S.C. 154(b) by 369 days.

(21) Appl. No.: 10/920,983

(22) Filed: Aug. 19, 2004

(65) Prior Publication Data

US 2007/0273192 A1    Nov. 29, 2007

(51) Int. Cl.
B60R 21/00 (2006.01)
B60N 2/06 (2006.01)
(52) U.S. Cl. .................... 297/216.17; 297/339
(58) Field of Classification Search ............ 297/216.17, 297/339, 344.12, 344.18, 344.19, 344.2, 297/464, 466, 468; 280/801.1, 748; 296/68.1
See application file for complete search history.

(56) References Cited

U.S. PATENT DOCUMENTS

| | | | | |
|---|---|---|---|---|
| 2,937,692 A | * | 5/1960 | McMichael, Jr. ............ 248/244 |
| 3,625,563 A | * | 12/1971 | Dickinson et al. ............ 297/333 |
| 3,954,041 A | * | 5/1976 | Mechulam et al. .......... 89/36.13 |
| 3,985,388 A | * | 10/1976 | Hogan .................... 297/216.17 |
| 4,525,010 A | * | 6/1985 | Trickey et al. .......... 297/216.17 |
| 5,344,204 A | | 9/1994 | Liu ............................. 296/68.1 |
| 6,179,380 B1 | * | 1/2001 | Hoffman ................ 297/216.17 |
| RE37,123 E | | 4/2001 | Templin et al. ......... 297/216.17 |
| 6,224,154 B1 | * | 5/2001 | Stoki ........................... 297/339 |
| 6,322,140 B1 | | 11/2001 | Jessup et al. ............ 297/216.17 |
| 7,100,991 B2 | * | 9/2006 | Schroth ...................... 297/468 |
| 2002/0021041 A1 | * | 2/2002 | Jessup et al. ................. 297/468 |

* cited by examiner

Primary Examiner—Milton Nelson, Jr.
(74) Attorney, Agent, or Firm—Kenneth L. Green; Edgar W. Averill, Jr.

(57) ABSTRACT

An Occupant Retraction System (ORS) retracts a partially exposed occupant into a vehicle. The system responds to a trigger, wherein an occupant support retracts and actively pulls the occupant into the vehicle interior. The triggering event may be initiated by a manual switch, a rollover sensor, a crash sensor, a hostile ordnance sensor, or the like. A belt, harness, or foot strap may be connected to the occupant support to pull the occupant into the vehicle interior. A forcing means may be provided by a spring, hydraulic, pneumatic, or electro-mechanical actuator. The system further includes a damper for limiting acceleration to a safe maximum.

19 Claims, 6 Drawing Sheets

OCCUPANT RETRACTION SYSTEM

BACKGROUND OF THE INVENTION

The present invention relates to a system and method for preventing injury of an occupant of a vehicle, and more particularly to preventing injury to an occupant of a vehicle by retracting the occupant into the vehicle during events which may otherwise result in injury to the occupant.

Various special purpose vehicles are used in a multitude of applications which may influence or dictate characteristics of the vehicles. Some applications may dictate a high Center-of-Gravity (CG) design, which high CG may result in a propensity to roll the vehicle. Further, the need for a high CG is generally associated with off-road use of the vehicle, which off-road use often result in the vehicle leaning at large roll or pitch angles (hereafter, "rolling" is intended to refer to motion about either a vehicle roll or pitch axis.)

One particular special purpose vehicle particularly susceptible to rolling is a military vehicle, and particularly an armored military vehicle. Military vehicles are often designed to operate over rough terrain, and to ford bodies of water. Such operation motivates substantial ground clearance, and the positioning of mechanical structure (engine, axles, differentials, etc.) high in the vehicle. Further, military vehicles often require armor on some exterior surfaces, and such surfaces are generally the top and side surfaces, versus the bottom which is not likely to be hit by enemy ordnance. The combination of the requirement for ground clearance and armor further contributes to a high CG, and a greater likelihood of rolling the vehicle Additionally, military vehicles often come under enemy fire and must react immediately to survive. In such cases, there is little time to evaluate the terrain which the vehicle must navigate to find cover from the enemy fire. As a result, the vehicle may take a path resulting in very large roll or pitch, which combined with a high CG may result in vehicle rollover. Further, the ability to see the situation surrounding the vehicle is critical to survival. While remote viewing means are available to a vehicle commander, for example, television or periscope, there is often a need to directly view the situation to make quick decisions. Such direct viewing requires that the vehicle commander be at least partially outside the vehicle. If vehicle rollover occurs while the commander is thus exposed, it is difficult for the commander to quickly "climb" back into the vehicle interior, and severe injury or death has resulted. In other instances, a vehicle may come under fire and a partially exposed occupant may be at immediate risk. In cases where the occupant has been injured by enemy fire, the injured occupant may be unable to quickly climb back into the vehicle interior.

There is thus a need for a system and method for repositioning (or retracting) a partially exposed vehicle occupant when one of above described events occurs.

BRIEF SUMMARY OF THE INVENTION

The present invention addresses the above and other needs by providing an Occupant Retraction System (ORS) which retracts a partially exposed occupant into a vehicle. The system responds to a triggering event, wherein an occupant support retracts and actively pulls the occupant into the vehicle interior. The triggering event may be initiated by a manual switch, a rollover sensor, a crash sensor, a hostile ordnance sensor, or the like. A belt, harness, and/or foot strap may be connected to the occupant support to pull the occupant into the vehicle interior. An actuating force may be provided by a spring, squib, hydraulic, pneumatic, and/or electro-mechanical actuator. The system further includes a damper for limiting acceleration to a safe maximum. The occupant retraction system is preferably resettable after each use.

In accordance with one aspect of the invention, there is provided an occupant retraction system comprising an occupant support having a first position adapted to position the occupant partially outside a vehicle, and a second position adapted to position the occupant substantially inside the vehicle. An occupant restraint is mechanically connected to the occupant support and adapted to pull the occupant with the occupant support when said occupant support moves from the first position to the second position. A forcing means is mechanically connected to said occupant support, wherein said forcing means is adapted to force said occupant support from the first position to the second position, and a trigger is provided for initiating said forcing means. A damping means is mechanically connected to said occupant support, said damping means adapted to resist motion of said occupant support to limit injury to the occupant.

BRIEF DESCRIPTION OF THE SEVERAL VIEWS OF THE DRAWING

The above and other aspects, features and advantages of the present invention will be more apparent from the following more particular description thereof, presented in conjunction with the following drawings wherein.

Corresponding reference characters indicate corresponding components throughout the several views of the drawings.

DETAILED DESCRIPTION OF THE INVENTION

The following description is of the best mode presently contemplated for carrying out the invention. This description is not to be taken in a limiting sense, but is made merely for the purpose of describing the general principles of the invention. The scope of the invention should be determined with reference to the claims.

Figure 1:
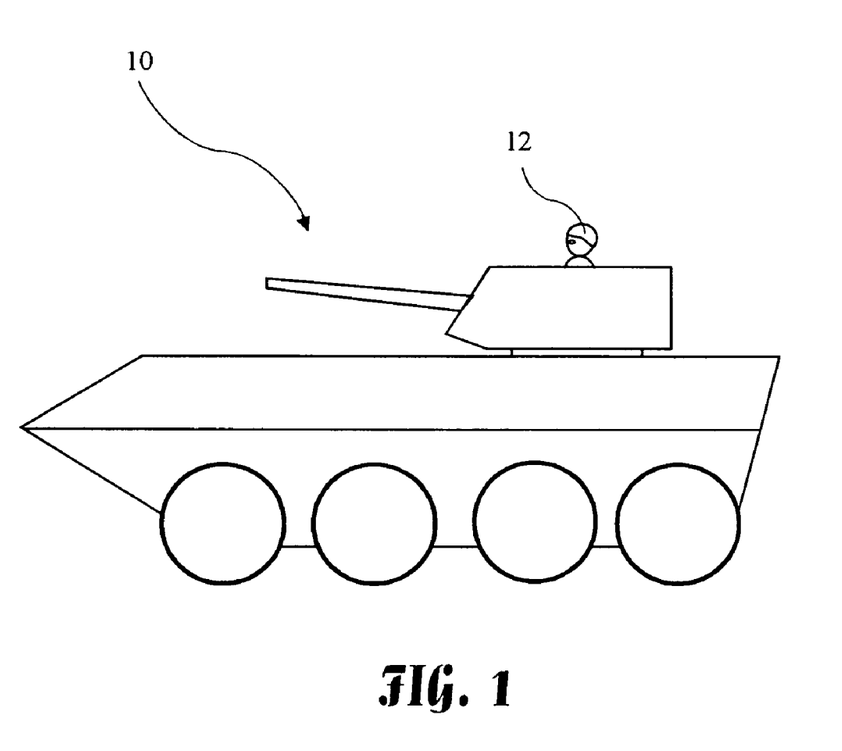
FIG. 1 is a typical vehicle suitable for an occupant retraction system, and an occupant partially outside the vehicle.

The present invention provides an Occupant Retraction System (ORS) adapted to protect an exposed occupant 12 of a vehicle 10, shown in FIG. 1. Vehicles which combine a high Center of Gravity (CG) with use in irregular terrain, and frequently have occupants partially exterior to the vehicle, create a likelihood of serious injury or death to such occupants. In particular, military vehicles, and more particularly Light Armored Vehicles (LAV), have a high CG and operate in irregular terrain. A LAV vehicle commander is frequently required to reside partially outside the LAV to visually observe the tactical situation surrounding the LAV. In many instances, such vehicles may roll-over, creating an extremely dangerous situation for the exposed occupant, or the vehicle commander may come under hostile fire, and may be injured and unable to quickly climb into the vehicle for cover.

Figure 2:
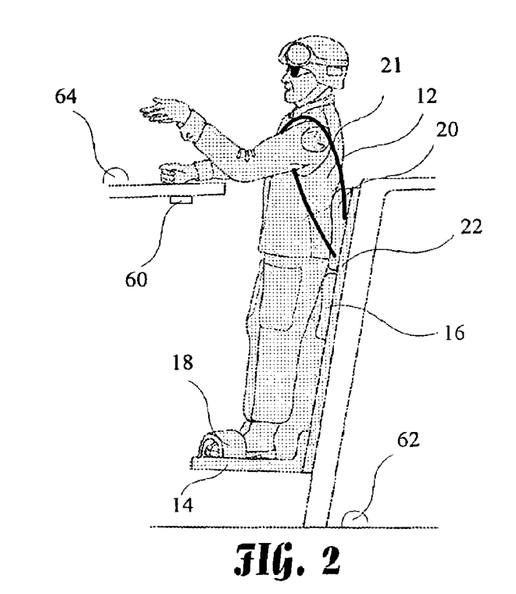
FIG. 2 shows an occupant standing partially outside the vehicle and supported by an occupant support in a first position.

A typical partially exposed occupant 12 is shown in a standing position in FIG. 2. The occupant 12 stands on a footrest 14 and is further supported by backrest 20 and seat 16, wherein the seat 16 is in a folded position. Foot straps 18 and a harness 21 may be included to aid in pulling the occupant 12 into the vehicle 10. The foot rest 14, seat 16, backrest 20, foot straps 18, and harness 21 are attached to an occupant support 22. The occupant retraction system is adapted to pull the occupant support 22 down, thereby retracting the exposed occupant 12 into the vehicle 10. The occupant retraction system may be exercised upon the occurrence of any one of several events and may be triggered by a manual switch 60 mounted to allow easy access by the occupant 12, a hostile fire sensor 64 mounted to facilitate sensing hostile fire, or a roll-over/crash sensor 62. The occupant retraction system is preferably less than 200 pounds in weight.

Figure 3:
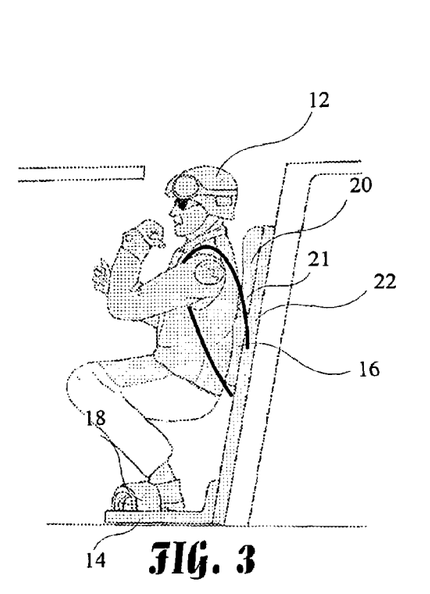
FIG. 3 shows the previously standing occupant retracted substantially inside the vehicle with the occupant support in a second position.

The occupant 12 is shown substantially retracted into the vehicle 10 in FIG. 3. The occupant 12 may be retracted completely into the vehicle, or some small portion of the occupant 12, or gear worn by the occupant 12, may somewhat protrude from the vehicle 10 when the occupant 12 is in a retracted position, and the degree of retraction need only be sufficient to protect the occupant 12. The harness 21 may further retract to a greater extent than the occupant support 22, to pull the occupant 12 further inside the vehicle 10.

Figure 4:
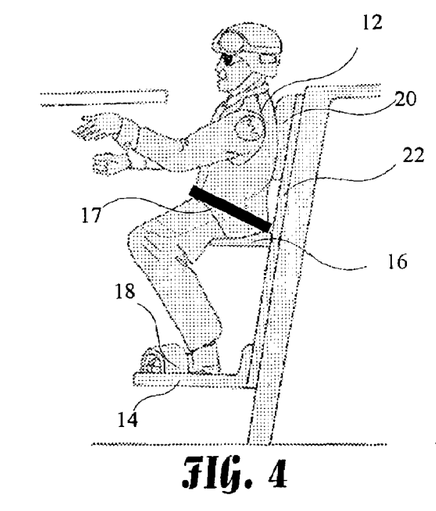
FIG. 4 shows a seated occupant partially outside the vehicle and supported by an occupant support in the first position.

The seat 16 is shown in a seating position with the occupant 12 seated thereon and partially outside the vehicle 10, in FIG. 4. The foot straps 18 and a seatbelt 17 may be included to aid in pulling the occupant 12 into the vehicle 10. The seated occupant 12 is shown substantially retracted into the vehicle 10 in FIG. 5.

Figure 6:
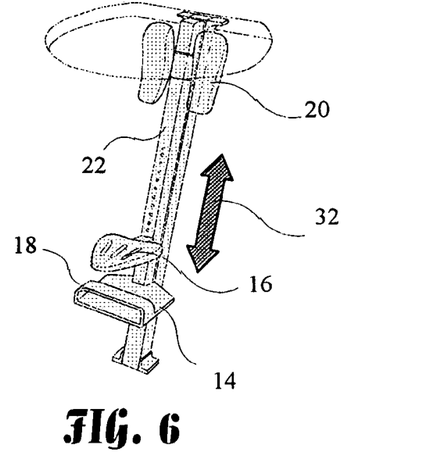
FIG. 6 shows an occupant support with footrest, seat, and back pads attached, wherein the seat is adjusted vertically down.
Figure 7:
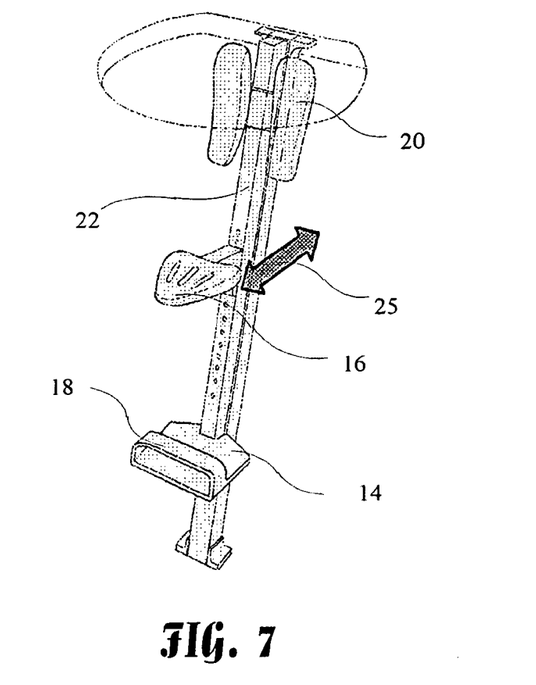
FIG. 7 shows the occupant support with footrest, seat, and back pads attached, wherein the seat is extended away from an occupant support.
Figure 8:
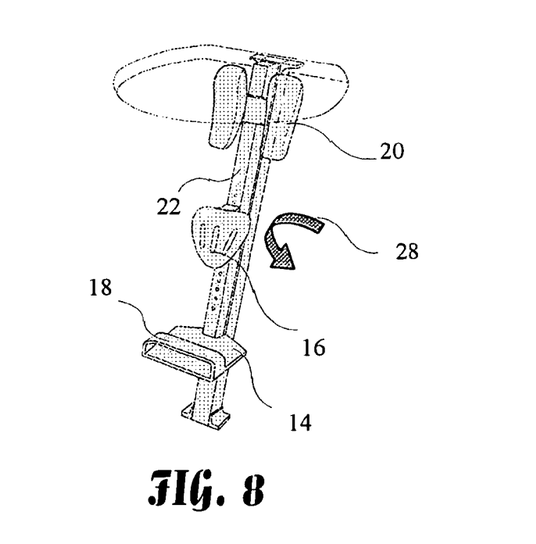
FIG. 8 shows the occupant support with footrest, seat, and back pads attached, wherein the seat is folded.

The seat 16 includes three independent adjustments. The seat 16 may be adjusted vertically relative to the occupant support 22 as shown by vertical arrows 32 in FIG. 6, the seat 16 may be adjusted horizontally relative to the occupant support 22 as shown by horizontal arrows 25 in FIG. 7, and the seat 16 may be folded between a seating position and a folded position as shown by rotation arrows 28 in FIG. 8.

Figure 9A:
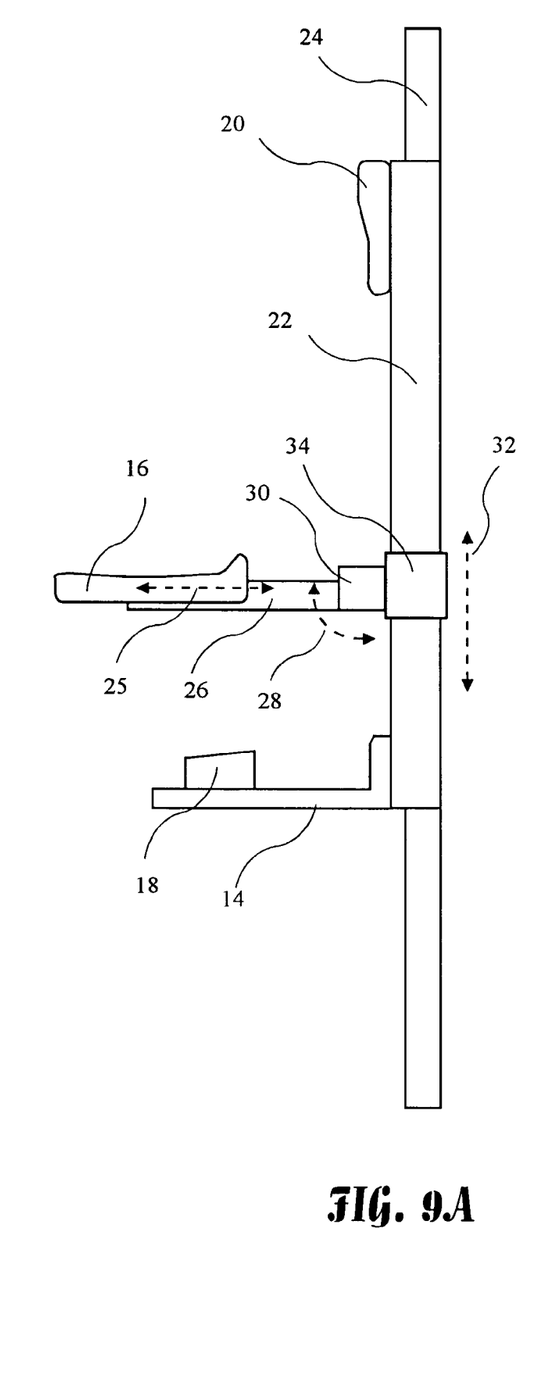
FIG. 9A shows a side view of the occupant retraction system with the seat in a horizontal position.

An enlarged side view of the occupant retraction system is shown in FIG. 9A. The occupant retraction system is shown with the seat 16 in a seating position. The seat 16 is adjusted away from the occupant support 22 on the seat brace 26, wherein the horizontal adjustment is indicated by horizontal arrows 25. A rotation bracket 30 is provided to allow the seat 16 to fold between the seating position and the folded position as shown by rotation arrows 28. The seat may further be adjusted vertically by sliding vertical bracket 34 along the occupant support 22 as shown by vertical arrows 32. The occupant support 22 is shown residing on a support member 24, wherein the occupant support 22 may move along the support member 24 to move the occupant support 22 between a first position adapted to position the occupant 12 partially outside the vehicle 10, and a second position adapted to position the occupant 12 substantially inside the vehicle 10.

Figure 9B:
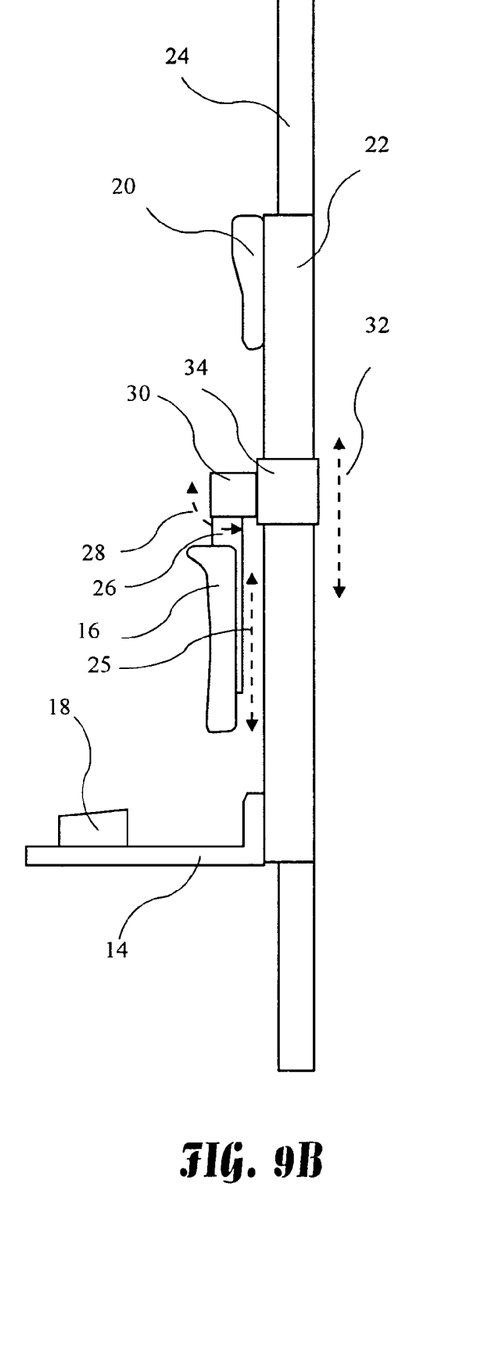
FIG. 9B shows a side view of the occupant retraction system with the seat in a folded position.

A view similar to FIG. 9A is shown in FIG. 9B wherein the seat 16 is shown in the folded position, and the occupant support 22 is moved downward on the support member 24.

Figure 10:
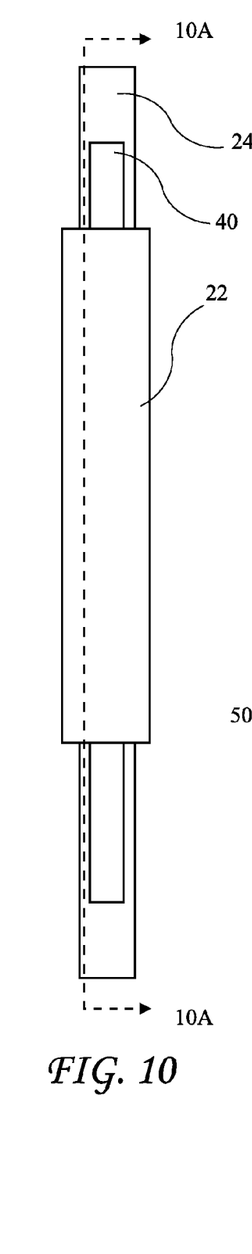
FIG. 10 shows details of the occupant support and a support member with which the occupant support cooperates.

A front view of the occupant support 22 and support member 24 is shown in FIG. 10. A support track 40 is shown as an opening in the front face of the support member 24. The support track 40 is a single example of a means for guiding the occupant support 22 on the support member 24, and is not intended to limit the present invention. Various means for guiding are anticipated for the present invention, including tracks inside the support member 24 and/or external to the support member 24. Further, the support member 24 may cooperate with a track internal and/or external to the occupant support 22. Any occupant retraction system including a means for guiding the occupant support 22 along the support member 24 is intended to come within the scope of the present invention. The support member 24 is preferably a backbone structure, and more preferably defines a two inch by four inch cross section, and is preferably made from aluminum. The term "backbone structure" as used herein is intended to mean a single centered structure member providing support to a plurality of elements (e.g., foot rest, seat, backrest, etc.) distributed along the length of the structure.

Figure 10A:
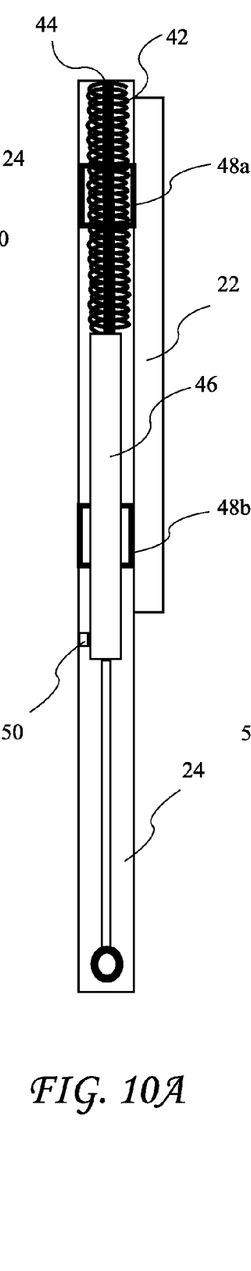
FIG. 10A shows a cross-sectional view of the occupant support and a support member taken along line 10A-10A of FIG. 10, wherein the occupant support is in an up position.

A cross-sectional view taken along line 10A-10A of FIG. 10 is shown in FIG. 10A. The occupant support 22 is shown connected to the support member 24, wherein a first support guide 48a and a second support guide 48b are attached to the occupant support 22 and slidably cooperate with the interior of the support member 24. The support guide 48b is shown attached to a damping means comprising a shock absorber 46 residing inside the support member 24. A spring 42 with spring guide 44 reside above the shock absorber 46, and provide downward force on the shock absorber 46 to retract the occupant 12 into the vehicle 10. The occupant support 22 may be connected to the shock absorber 46 though an open front of the support member 24, or through vertical slots in the support member 24. While a simple spring has been shown as an example, any suitable forcing means maybe utilized, such as a hydraulic cylinder, a pneumatic cylinder, an electronic device (e.g., a solenoid), or a pyrotechnic device adapted to provide linear force, and any forcing means providing sufficient acceleration is usable.

The damping means may be any suitable shock absorber, for example, a hydraulic shock absorber, a gas shock, a friction device, or an electro-mechanical shock absorber (e.g., solenoid adapted to provide a magnetic field to resist motion) or a combination of any of the above. Preferably, the damping means has at least approximately eighteen inches of travel and may have as much as approximately thirty inches of travel, and may be a type of shock absorber commonly called a "monster truck shock," and preferably includes cartridge control. Damping means may further include a system to vary the damping such as a variable fluid flow control through an orifice, or a clamping device to increase damping friction. The damping means preferable limits the acceleration of the occupant support 22 to two Gs of acceleration or deceleration to prevent injury to the occupant. However, acceleration may be controllable based on scenario and may be from as small as one G to as great as fifteen Gs (e.g., permits very high acceleration when a rapid roll over occurs, in order to prevent serious injury or death.)

A release 50 cooperates with the shock absorber 26 to lock the occupant support 22 in the first position wherein the occupant 12 is partially outside the vehicle 10. The release 50 may be released by the manual trigger 60, the rollover/crash sensor 62, and/or the hostile fire sensor 64, to release the occupant support 22 and cause the occupant 12 to be retracted into the vehicle 10. The release 50 may be a mechanical trigger mechanism, like in a hunting rifle or an electrical device like a solenoid or a combination of both, and may be one of many embodiments. The release 50 may cooperate with the spring 42, either support guide 41a or 48b, the occupant support 22, or any other element of the present invention wherein actuation of the release 50 causes the occupant support 22 to move from the first position to the second position, and any occupant retraction system including any release providing this functionality is intended to come within the scope of the present invention.

Figures 10B, 10C:
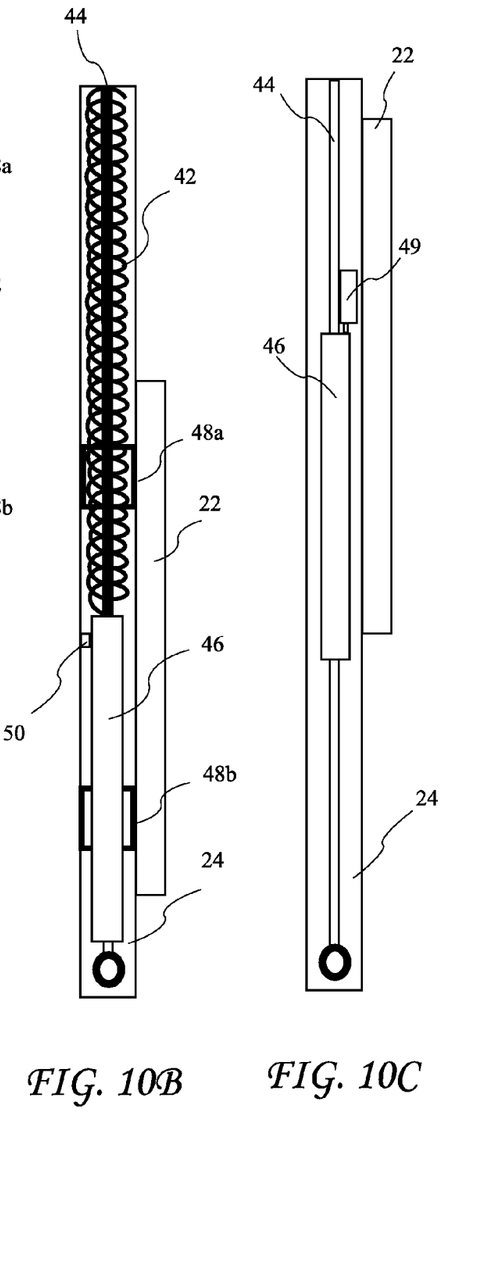
FIG. 10B shows a second cross-sectional view of the occupant support and a support member taken along line 10A-10A of FIG. 10, wherein the occupant support is in a down position.
FIG. 10C shows a third cross-sectional view of the occupant support and a support member taken along line 10A-10A of FIG. 10, wherein a forcing means is a squib.
Figure 11:
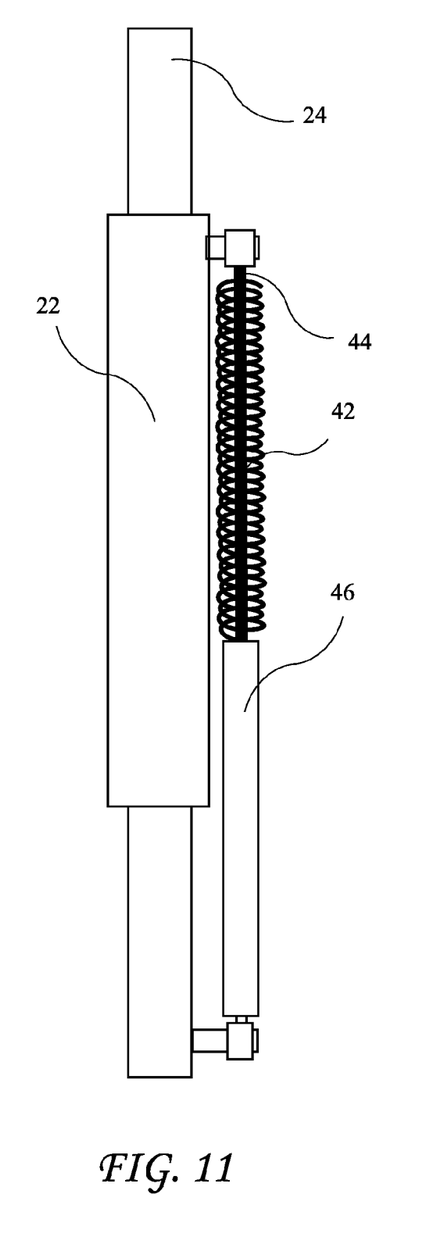
FIG. 11 is a occupant support and support member connected by an external shock absorber and spring assembly.

A second cross-sectional view taken along line 10A-10A of FIG. 10 is shown in FIG. 10B, wherein the occupant support 22 is shown in a second (i.e., retracted) position, wherein the release 50 has released the shock absorber 46. The occupant support 22 may further be returned to the first position following resolution of the triggering event. An embodiment with an occupant support 22 and support member 24 connected by an external shock absorber 46 and spring 42 is shown in FIG. 11.

A third cross-sectional view of the occupant support 22 and a support member 24 taken along line 10A-10A of FIG. 10, wherein a forcing means is a squib 49.

Figure 5:
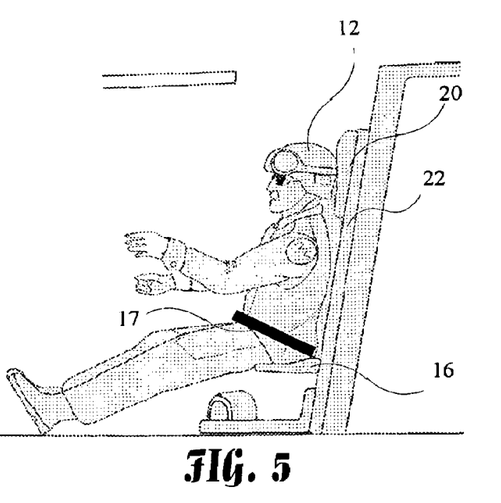
FIG. 5 shows a seated occupant retracted substantially inside the vehicle and supported by the occupant support in a second position.

The occupant retraction system may further include structure to retract the occupant 12 independently from the occupant support 22, wherein the occupant 12 is retracted further than the travel of the occupant support 22 (see FIGS. 4 and 5). For example, a particular harness routing may result in occupant 12 retraction twice the motion of the occupant support 22. For example, a harness may be connected to the support member 24, and cooperate with a roller attached to the occupant support 22, whereby motion of the occupant support 22 results in twice the motion of the harness. Additionally, occupant retraction may be enhanced by actively tightening a seat belt during the retraction to reduce the chance of injury during a roll over or other event. For example, a resettable seat belt retraction (pretensioner) device may be included which acts independently or in conjunction with Occupant Retraction System (ORS) described in FIGS. 2-11 above.

Figure 12:
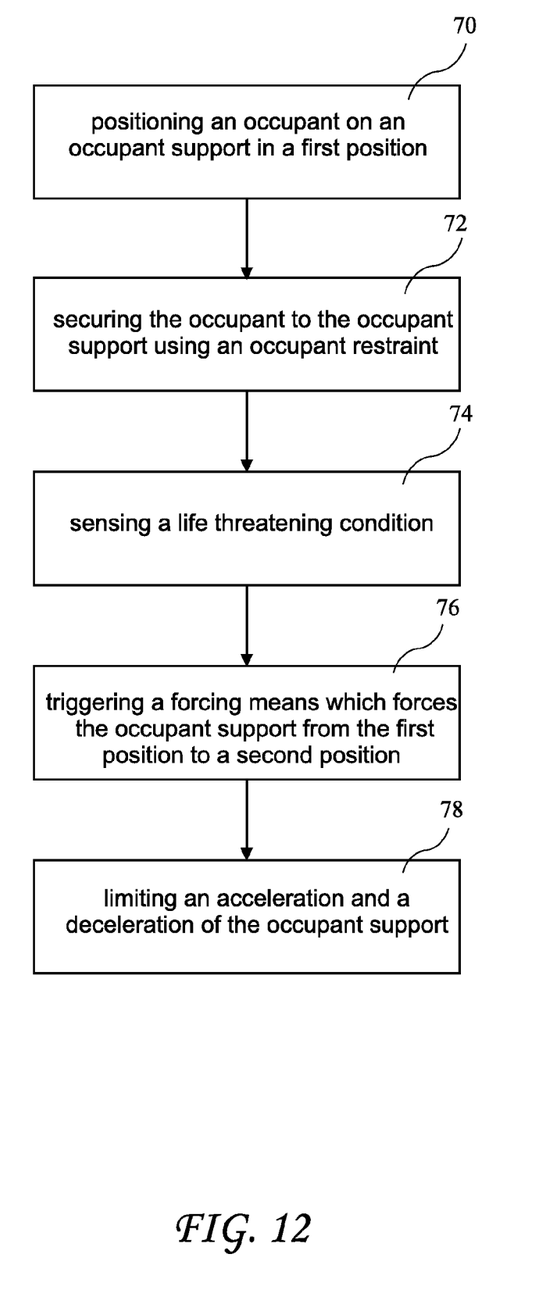
FIG. 12 describes a method according to the present invention for retracting an exposed occupant into a vehicle.

A method according to the present invention for retracting a partially exposed occupant into a vehicle is described in FIG. 12. The method comprises positioning an occupant on an occupant support in a first position at 70, and securing the occupant to the occupant support using an occupant restraint at 72. Following sensing a life threatening condition at 74, triggering a forcing means which forces the occupant support from the first position to a second position in which the occupant is substantially inside the vehicle at 76. The system limits an acceleration and a deceleration of the occupant support to prevent injury to the occupant at 78.

While the invention herein disclosed has been described by means of specific embodiments and applications thereof, numerous modifications and variations could be made thereto by those skilled in the art without departing from the scope of the invention set forth in the claims.

We claim:
1. An occupant retraction system comprising:
   a guide member;
   an occupant support attached to the guide member to slide along the guide member between a first position adapted to position the occupant partially outside a vehicle, and a second position adapted to position the occupant substantially inside the vehicle;
   an occupant restraint mechanically connected to said occupant support and adapted to pull the occupant with the occupant support when said occupant support moves from the first position to the second position;
   a forcing means mechanically connected to said occupant support, wherein said forcing means is adapted to force said occupant support from the first position to the second position;
   a trigger for initiating said forcing means; and
   a damping means mechanically connected to said occupant support, said damping means adapted to dampen motion of said occupant support and said occupant.

2. The system of claim 1, wherein the occupant restraint comprises at least one of a group consisting of a seat belt and a harness.

3. The system of claim 1, wherein said guide member comprises a backbone structure.

4. The system of claim 1, wherein the forcing means comprises a spring.

5. The system of claim 1, wherein the forcing means comprises a cylinder selected from the group consisting of a hydraulic cylinder and a pneumatic cylinder.

6. The system of claim 1, wherein the forcing means comprises an electronic device.

7. The system of claim 1, wherein the forcing means comprises a squib.

8. The system of claim 1, wherein the trigger comprises a sensor selected from the group consisting of a rollover sensor and a crash sensor, and a release.

9. The system of claim 1, wherein the damping means comprises a mechanical shock absorber.

10. The system of claim 1, wherein the damping means comprises an electronic shock absorber.

11. An occupant retraction system comprising:
    an occupant support having a first position adapted to position the occupant partially outside a vehicle, and a second position adapted to position the occupant substantially inside the vehicle;
    a footrest and a seat attached to said occupant support,
    an occupant restraint mechanically connected to said occupant support and adapted to pull the occupant with the occupant support when said occupant support moves from the first position to the second position;
    a forcing means mechanically connected to said occupant support, wherein said forcing means is adapted to force said occupant support from the first position to the second position;
    a trigger for initiating said forcing means; and
    a damping means mechanically connected to said occupant support, said damping means adapted to dampen motion of said occupant support and said occupant.

12. The system of claim 11, wherein said seat is adjustable vertically relative to said occupant support.

13. The system of claim 11, wherein the seat is foldable between a seating position and a folded position.

14. The system of claim 11, further including a guide member, wherein the occupant support translates along the guide member to move from the first position to the second position, and wherein the seat is extendable towards or away from the guide member.

15. An occupant retraction system comprising:
an occupant support having a first position adapted to position the occupant partially outside a vehicle, and a second position adapted to position the occupant substantially inside the vehicle;
an occupant restraint comprising a footstrap mechanically connected to said occupant support and adapted to pull the occupant with the occupant support when said occupant support moves from the first position to the second position;
a forcing means mechanically connected to said occupant support, wherein said forcing means is adapted to force said occupant support from the first position to the second position;
a trigger for initiating said forcing means; and
a damping means mechanically connected to said occupant support, said damping means adapted to dampen motion of said occupant support and said occupant.

16. An occupant retraction system comprising:
an occupant support having a first position adapted to position the occupant partially outside a vehicle, and a second position adapted to position the occupant substantially inside the vehicle;
an occupant restraint mechanically connected to said occupant support and adapted to pull the occupant with the occupant support when said occupant support moves from the first position to the second position;
a forcing means mechanically connected to said occupant support, wherein said forcing means is adapted to force said occupant support from the first position to the second position;
a trigger comprising a hostile ordnance sensor and a release for initiating said forcing means; and
a damping means mechanically connected to said occupant support, said damping means adapted to dampen motion of said occupant support and said occupant.

17. An occupant retraction system comprising:
an occupant support having a first position adapted to position the occupant partially outside a vehicle, and a second position adapted to position the occupant substantially inside the vehicle;
an occupant restraint mechanically connected to said occupant support and adapted to pull the occupant with the occupant support when said occupant support moves from the first position to the second position;
a forcing means mechanically connected to said occupant support, wherein said forcing means is adapted to force said occupant support from the first position to the second position;
a trigger comprising a manual switch and a release for initiating said forcing means; and
a damping means mechanically connected to said occupant support, said damping means adapted to dampen motion of said occupant support and said occupant.

18. A method for retracting a partially exposed occupant into a vehicle, the method comprising:
positioning an occupant on an occupant support in a first position, wherein in the first position the occupant is partially outside a vehicle;
securing the occupant to the occupant support using an occupant restraint;
sensing a life threatening condition;
triggering a forcing means which forces the occupant support from the first position to a second position in which the occupant is substantially inside the vehicle; and
limiting an acceleration and a deceleration of the occupant support to prevent injury to the occupant.

19. A retracting occupant support comprising:
a first position adapted to position an occupant partially outside a vehicle, and a second position adapted to position the occupant substantially inside the vehicle;
an occupant restraint mechanically connected to said occupant support and adapted to pull the occupant with the occupant support when said occupant support moves from the first position to the second position;
a squib mechanically connected to said occupant support, wherein said squib may be fired to force said occupant support from the first position to the second position;
a trigger for firing said squib, wherein said trigger comprises at least one selected from a group consisting of a manual switch and a rollover sensor; and
a shock absorber mechanically connected to said occupant support, said shock absorber adapted to resist motion of said occupant support.

* * * * *